United States Patent
Sabry et al.

(10) Patent No.: US 6,728,266 B1
(45) Date of Patent: Apr. 27, 2004

(54) PRICING MECHANISM FOR RESOURCE CONTROL IN A COMMUNICATIONS NETWORK

(75) Inventors: Martin Sabry, Cambridge (GB); John E Midwinter, Great Bealings (GB); Paul A Kirkby, Harlow (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/471,440

(22) Filed: Dec. 23, 1999

(51) Int. Cl.[7] .................... G01R 31/08; H04L 12/28; H04J 3/16; H04M 1/56
(52) U.S. Cl. .................. 370/468; 370/230; 370/396; 370/395.21; 379/114.02; 379/114.07
(58) Field of Search ................ 709/104, 219, 709/225, 226, 227, 228, 229; 379/153, 114.01, 114.03, 114.05, 114.06, 114.07, 114.08, 133, 130; 370/468, 400, 395.21, 395.2, 395.41, 401, 238

(56) References Cited

U.S. PATENT DOCUMENTS

| | | | | |
|---|---|---|---|---|
| 5,828,737 A | * | 10/1998 | Sawyer | 379/114 |
| 5,974,308 A | * | 10/1999 | Vedel | 379/130 |
| 6,003,090 A | * | 12/1999 | Puranik et al. | 709/235 |
| 6,208,977 B1 | * | 3/2001 | Hernandez et al. | 705/34 |
| 6,222,824 B1 | * | 4/2001 | Marin et al. | 370/230 |
| 6,338,046 B1 | * | 1/2002 | Saari et al. | 379/114 |
| 6,411,603 B1 | * | 6/2002 | Ahuja et al. | 370/238 |
| 6,421,434 B1 | * | 7/2002 | Rosu | 379/133 |
| 6,542,588 B1 | * | 4/2003 | Mashinsky | 379/114.02 |

OTHER PUBLICATIONS

Pricing congestible network resources by Jeffrey K MacKie-Mason and Hal R Varian, IEEE Journal on selected areas in communications, vol. 13 no 7 Sep. 1995.

* cited by examiner

Primary Examiner—Hassan Kizou
Assistant Examiner—Hanh Nguyen
(74) Attorney, Agent, or Firm—Barnes & Thornburg (57) ABSTRACT

In order to provide price information to customers quickly a fast reflector switch is used. This helps to ensure that price information provided to customers is as up-to-date as possible. To determine a price for use of a particular route in a communications network, the available resources at each node in that route are assessed. The most congested node in that route is selected and a price determined on the basis of the available capacity at that node. This price is then delivered to the customer via the fast reflector switch. In another example, the average amount of available resources at each node in the route is determined over a specified time period. The standard deviation of the resource level values at each node over the specified time period is also determined. A price is then set on the basis of the sum of the average amounts and the sum of the standard deviations. In this way a price which takes into account recent variation in traffic levels as well as average traffic levels is provided.

24 Claims, 7 Drawing Sheets

PRICING MECHANISM FOR RESOURCE CONTROL IN A COMMUNICATIONS NETWORK

BACKGROUND OF THE INVENTION

1. Field of the Invention

This invention relates to a method of determining a threshold value for gaining access to a communications network and in particular, but in no way limited to the case where the threshold value is a price. The invention also relates to an apparatus for implementing this method and to a communications network comprising such an apparatus. The invention also encompasses a computer program for controlling the aforementioned apparatus.

2. Description of the Prior Art

Traffic levels in a communications network typically vary over time and one problem for network operators is how to make maximum use of the network resources such as bandwidth despite this variation. However, at the same time, network operators need to ensure that the performance of network resources does not drop because of over-use. For example, when there is over-use of communications network resources such as the switching capacity of routers, the bandwidth of the transport medium, and the disk and CPU capacity of popular servers, then performance of these resources drops dramatically and affects the overall performance of the network.

One approach to dealing with communications network resource allocation is to establish rationing or quota systems. Under these types of schemes, additional users are simply rejected by web servers or other network services when the load becomes too high. One advantage of rationing and quota systems is that they are simple. However, under this type of system the relative values that users place on use of the communications network are not taken into account and whether a particular request for a communications session is accepted or rejected under such a scheme is arbitrary.

An alternative approach involves using pricing mechanisms to deal with resource allocation in communications networks. This type of approach has been analysed theoretically by economists such as MacKie-Mason and Varian in, "Pricing congestible network resources", IEEE Journal on Selected Areas in Communications, Vol 13. No. 7 September 1995. However, until now, no practical implementation of such a pricing mechanism has been proposed for a communications network. The theoretical pricing mechanism methods rely on providing customers with a price that varies depending on particular factors. Providing such a price allows the customer to weigh up their own costs and benefits from usage and the congestion cost that they will impose on other users. However, no practical way of providing such pricing information to users has been proposed. One particular problem involves providing pricing information to customers quickly, in order that the prices are not "out of date" when they reach the customer. Another problem involves providing pricing information without creating large amounts of additional traffic as a result of the pricing mechanism itself. As well as this the price needs to reflect factors to do with a whole route over a communications network which comprises a plurality of nodes and links. One problem is how to provide a single "price" which reflects factors over a whole route rather than just a localised region of a communications network.

It is accordingly an object of the present invention to provide a method of determining a threshold value for gaining access to a communications network which overcomes or at least mitigates one or more of the problems noted above.

SUMMARY OF THE INVENTION

According to the present invention there is provided a method of determining a threshold value for gaining access to a communications network, said communications network comprising a plurality of resources, said method comprising the steps of:

for each of a plurality of the resources determining a first value on the basis of the amount of resources available at that resource; and determining said threshold value on the basis of one or more of said first values.

This provides the advantage that a threshold value is given which enables a customer to weigh up their own costs and benefits of using the communications network at a particular time, as well as enabling the customer to take into account the effect that their own use of the network at that time will have on other users. The threshold value is a single value that is simple and used to represent complex information in a straight forward manner.

The present invention also provides a method of controlling access to a communications network said communications network comprising a plurality of resources, said method comprising the steps of:

receiving an access request from a user, said access request containing a first value;

for each of a plurality of said resources, determining a second value on the basis of the amount of resources available at that resource;

determining a threshold value on the basis of one or more of said second values; and comparing said first value and said threshold value and allowing access to said communications network on the basis of said comparison.

This provides the advantage that a service provider or network operator is able to control access to a communications network in a way which promotes efficient use of the communications network and tends to prevent congestion. The method of controlling access to the communications network is simple and quick to operate.

The present invention also provides a method of requesting access to a communications network, said communications network comprising a plurality of resources, said method comprising the steps of:

sending a request for a threshold value to a node in said communications network;

receiving said threshold value;

sending a request for access to said communications network said request comprising a value determined on the basis of said threshold value.

This enables a customer to request access to a communication network in such a way that the communications network resources are efficiently used. The customer is able to take into account his or her own costs and benefits of using the network as well as the effect that the proposed use will have on other users of the network. At the same time, the method for use by the customer is simple to understand and operate.

According to another aspect of the present invention there is provided an apparatus for determining a threshold value for gaining access to a communications network, said communications network comprising a plurality of resources, said apparatus comprising:

an input arranged to access a first value related to the amount of resources available at that resource, for each of a plurality of said resources;

a processor arranged to determine said threshold value on the basis of one or more of said first values.

This provides the advantage that equipment for determining the threshold value described above is given.

According to another aspect of the present invention there is provided a communications network comprising a plurality of resources and a processor arranged to access a plurality of first values, each related to the amount of resources available at a resource, and wherein said processor is arranged to determine a threshold value on the basis of one or more of said first values. This provides the advantage that a communications network which comprises equipment for determining a threshold value as described above is given. All the advantages provided by this threshold value as then attained as described herein.

According to another aspect of the present invention there is provided a computer program stored on a computer readable medium, said computer program being arranged to control an apparatus for determining a threshold value for gaining access to a communications network, said communications network comprising a plurality of resources, said computer program being arranged to control said apparatus such that:

a plurality of first values are accessed, each relating to the amount of resources available at one of said resources; and a threshold value is determined on the basis of one or more of said first values.

Further benefits and advantages of the invention will become apparent from a consideration of the following detailed description given with reference to the accompanying drawings, which specify and show preferred embodiments of the invention.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 1:
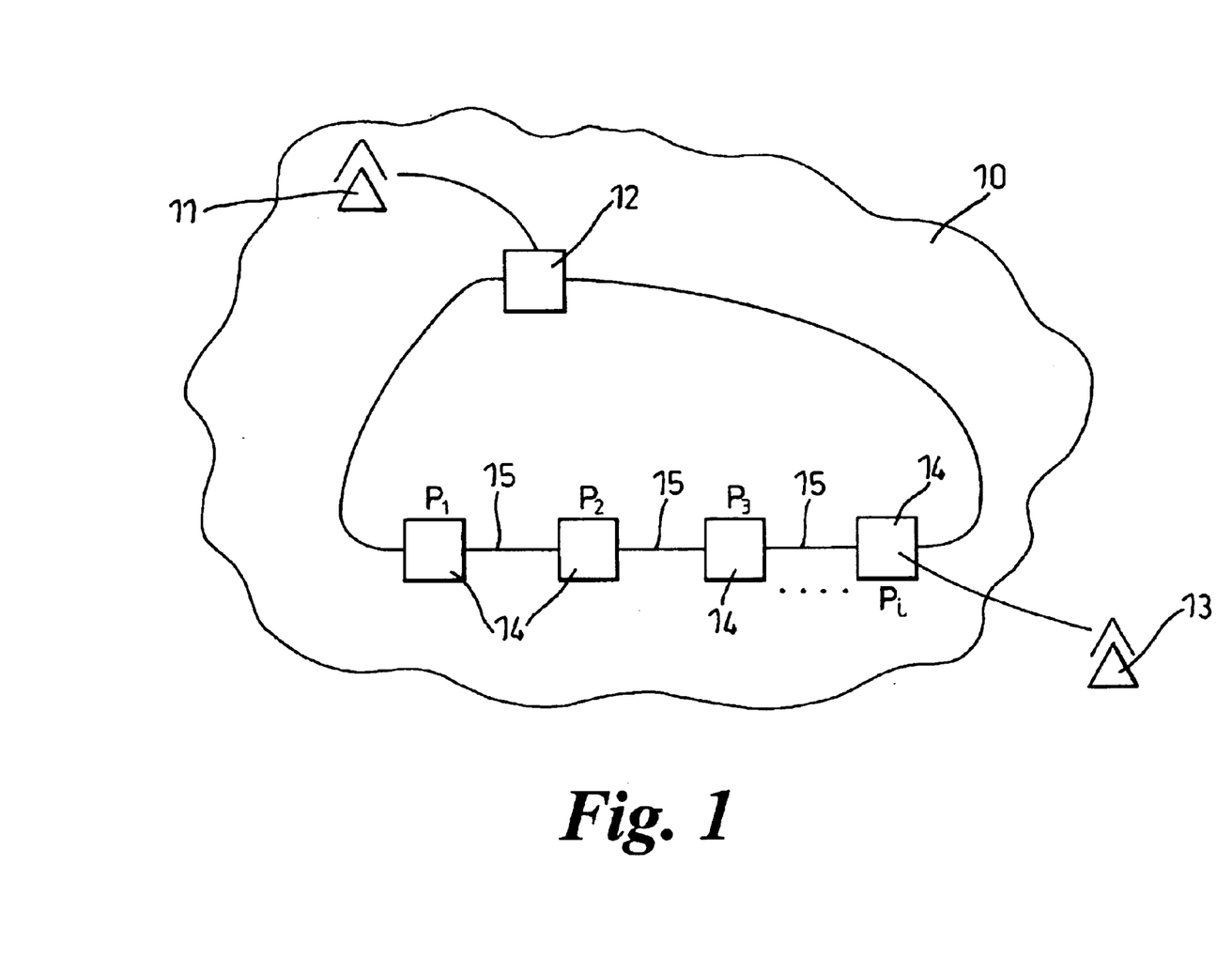
FIG. 1 is a general schematic diagram of a communications network showing price values for individual network resources or nodes.

FIG. 1 is a schematic diagram of a communications network 10 which comprises an originating terminal 11, an access node such as an internet protocol ingress router 12, and a plurality of nodes 14 interconnected by links 15. A destination terminal 13 is also shown. The communications network comprises many other terminals, nodes and links although these are not shown in FIG. 1 for reasons of clarity. The nodes 14 and links 15 are examples of resources in the communications network. Other examples of resources include services provided by a communications network rather than actual nodes or links. Also, the originating and destination terminals may be replaced by automated software agents which enable a customer or user to send or receive messages over the communications network 10. Such automated software agents may be housed on terminals or may be distributed over a plurality of components in the communications network 10.

As shown in FIG. 1 the originating terminal 11 is connected to the destination terminal 13 indirectly over the communications network 10. There are several different routes between the originating and destination terminal 13 although only one such route is illustrated in FIG. 1. This route necessarily has a limited capacity. Each of the nodes 14 and links 15 that are part of this route are also part of other routes between other terminals (not shown) and can form part of larger processors performing other tasks as well as the task of routing messages through the network.

Considering a customer who is a user of the originating terminal 11, it is desired to provide that customer with price information for access to the communications network, and in one example, for access to a route to the destination terminal 13. This price information could be an amount of money that the customer must pay the network operator for use of the network over the required route. However, this is not essential. Instead of price information a value may be provided to the customer which indicates the level of priority that a message should have to be communicated over that route at that time. That is, instead of an actual price a value or other indicator may be used which does not represent money or money's worth. The value should enable the customer to weigh up their own costs and benefits of using the network at a particular time as well as enabling the customer to take into account the effect that their own use of the network at that time will have on other users. Although the examples discussed below refer to prices any suitable type of value or priority indicator may be used.

A method of determining a price for access to the communications network 10 is now described. Considering one resource or node 14 in the route between the originating terminal 11 and the destination terminal 13, at a given point in time there is a certain amount of available resources or capacity at that node. A first value $P_i$ is determined for that node on the basis of the amount of available resource or capacity at that node. For example, the first value may be linearly related to the amount of available resources or capacity. It is not essential to use a linear relationship; any suitable relationship may be used.

In the same way, first values $P_i$ are determined for each of the nodes or resources 14 in the route between the originating terminal 11 and the destination terminal 13. Together these first values give information about the traffic levels in the network at a particular time. These first values can be thought of as prices in their own right. However, providing all these prices to the customer together with prices for nodes on alternative routes would be impractical and create significant additional traffic on the network. Instead, a threshold value or price is determined on the basis of one or all of the first values. For example, the maximum of the first values is selected and communicated to the access node 12 for transmission to the customer at the originating terminal 11. In this way a single value is provided to the customer and network traffic is not significantly increased. The threshold value or price thus varies according to the amount of network resources available at the nodes 14 and this information is made available to the customer via a terminal 11. It is also possible to specify the threshold value or price in other ways. For example, as the mode of the first values, or a simple running total of the first values. Selecting the maximum of the first values is particularly advantageous because it is a simple and effective method. Using this approach the price is set according to the most congested node in a route.

In the example discussed above, the amount of resources available at nodes in a route is determined. However, the method also applied to situations where services are being provided using the communications network and a threshold value is determined that relates to the amount of resources available for providing that service. In this case, the same method is used as described above, but instead of determining the amount of available resources at nodes in the network, the amount of resources available for providing the service are assessed. For example, the service may be provided by a small amount of the total capacity at a given node, and at any one time, the service uses only a certain proportion of the capacity allocated for that service. The term "resource" is used to refer to any type of network element or service which is limited in respect of the amount, volume, capacity or other measure of its use. For example, a resource may be a network node, link or service provided over the communications network. Examples described herein with reference to specific routes and nodes in communications networks are also applicable to other types of network resources such as services provided over the network.

The customer is able t evaluate the threshold value or price and to assess his or her own costs and benefits of using the route at that time. The threshold value or price also enables the customer to take into account the effect that his or her own use of the network will have on others. This enables the problem of "congestion externality" to be addressed. This problem is also known as the "problem of the commons" by ecologists.

Because the amount of resources available at a node or other resource in a communications network typically varies significantly with time, it is advantageous to use first values that allow this variation to be taken into account. For example, in another embodiment, this is done by arranging each node 14 or a processor associated with each node 14, to determine the average $MP_i$ amount of resources available at that node over a specified time period. As well as this an indicator of the amount of variation in the resource levels is determined, such as the standard deviation $SDP_i$ of the distribution of resource level values over the specified time period. Together the mean $MP_i$ and standard deviation $SDP_i$ of the resource level values provide an indication of the resource level "behaviour" at a node. The sum of the mean and standard deviation values from each node in the route is then computed to give a threshold value or price. This price is then transmitted to the customer via the network access node 12 and terminal or automated agent 11.

As discussed above, one problem involves providing price information to customers quickly in order that the price information is not "out of date". In order to determine the amount of resources available at nodes in the communications network the nodes themselves need to be monitored. However, to communicate information about the amount of resources available to customers will take a finite time of about $10^{-5}$ seconds for the shortest access loops to about $10^{-1}$ seconds for the longest trans-oceanic circuits. Because the loading of resources in a communications network changes rapidly, it is difficult to provide customers using the longest access loops "real time" price information. In this situation, price information provided to a customer will be somewhat out of date and the pricing mechanism needs to take this into account.

Figure 2:
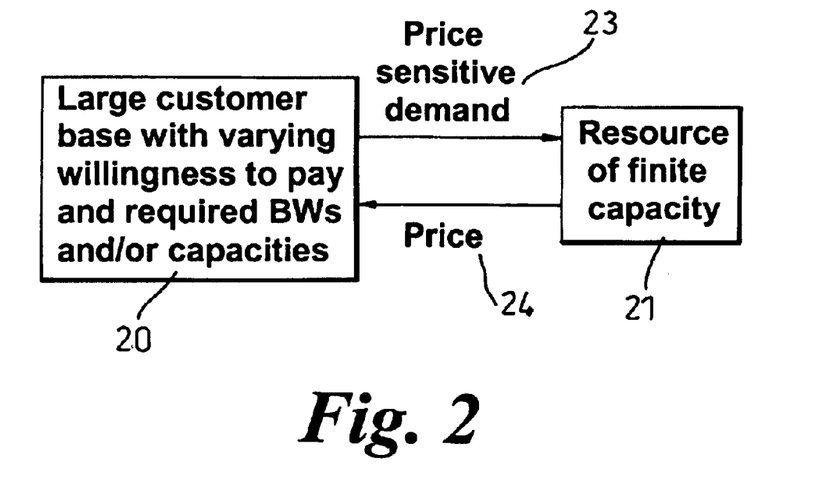
FIG. 2 is a general schematic diagram showing the relationship between customers and a service provider using dynamic pricing.

FIG. 2 is a schematic diagram of the relationship between customers and a network provider for a local loop in a communications network. A large customer base 20 exists in which different customers have different degrees of willingness to pay for use of the communications network. These customers also have different bandwidth and capacity requirements. The network provider on the other hand has a resource of finite capacity 21 such as a communications network comprising nodes of limited capacity and links of limited bandwidth. Demand 23 that the customer base has for the network provider's resource 21 is assumed to be sensitive to a price 24 that the network provider charges. This price 24 is dynamic and changes in a way related to the amount of resources available, as determined by the network provider.

Figure 3:
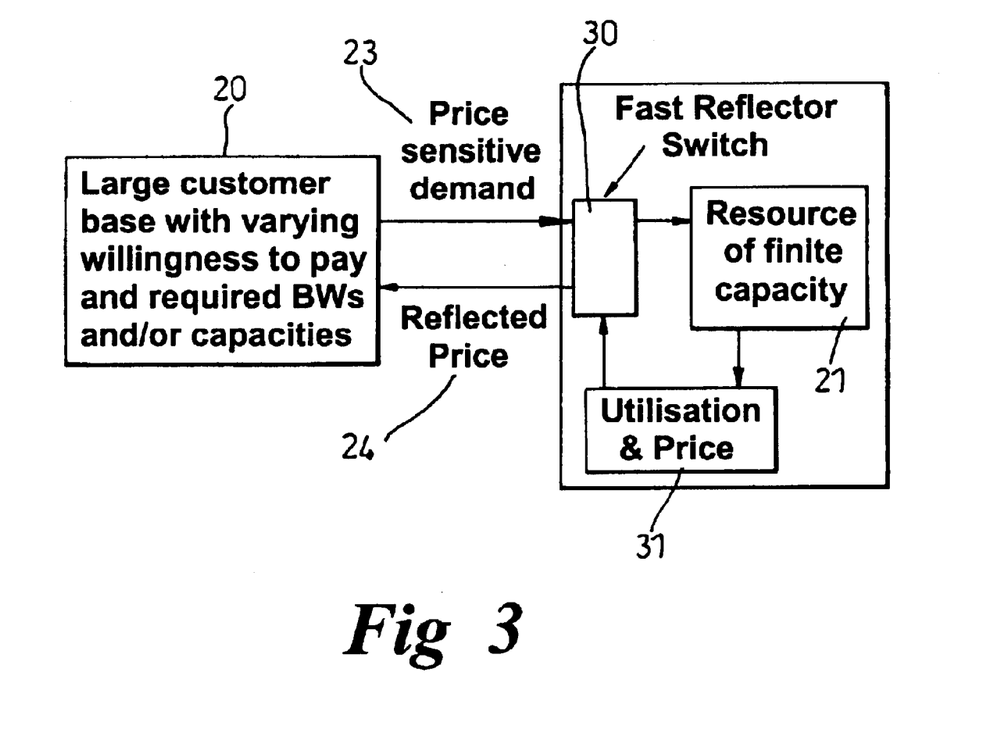
FIG. 3 is a flow diagram of a pricing mechanism for a communications network incorporating a fast reflector switch.

In order to provide price information to customers as quickly as possible a fast reflector switch 30 is used as illustrated in FIG. 3. The fast reflector switch 30 is a node or any other suitable type of processor in a communications network. The fast reflector switch 30 is connected to the resource 21 and monitors the capacity of that resource over time. It determines 31 a price or threshold value on the basis of the current capacity of the resource 21 and "reflects" 24 this price to the customer. The fast reflector switch 30 is also connected to or associated with an access point to a communications network. Requests (or actual traffic) from customers to use the communications network are received by the fast reflector switch which has the ability to accept or reject those requests (or traffic) on a virtually instantaneous basis.

In one embodiment, units of traffic forwarded by a customer carry with them an expression of that customer's Willingness to Pay WP. This Willingness to Pay represents the priority that the customer attaches to a particular item of traffic. This WP value can be a price that the customer bids or offers to pay the network operator. Alternatively the WP can be any type of indication of the priority that the customer attaches to that item of traffic, rather than actual money or moneys worth.

The customer first requests price information from the network operator and is provided with this information via the fast reflector switch 30. If the customer then decides to go ahead and use the requested communications route over the network, a request to use the route is forwarded from the originating terminal 11 to the access rode 12 together with an offer value or WP. This offer value is compared with the current threshold value (or current price) and if the offer value is greater than or equal to the threshold value the requested communications session is set-up. This comparison process takes place in the fast reflector switch 30 or any other suitable processing node. However, if the offer is less than the threshold value the requested communications session is refused. Having said this, it is not essential for the customer to forward an offer value or WP. By requesting a call after having requested price information, the customer can be deemed to have accepted the price last quoted.

Returning to the example in which the threshold value or price is determined on the basis of the mean and standard deviation of resource levels, in this case, the WP value given by the customer is preferably specified as:

$$WP = \sum_{i=1}^{m} MP_i + n \cdot \sum_{i=1}^{m} SDP_r$$

Where m is the number of individual network resources utilised and n is an integer value chosen by the customer. The larger the value of n the higher priority the customer assigns to the proposed communication session. The customer decides on his or her priority for transmission and sets a WP value accordingly using the equation given above. The customer then launches his or her traffic unannounced into the communications network together with the WP value. The customer takes "pot-luck" as to whether or not the unannounced traffic will be accepted by the fast reflector switch 30. However, the customer is able to materially affect his or her chances of the traffic being accepted by his or her choice of the value n. That is, the larger the value of n the higher priority the customer assigns to the traffic.

In another example, the customer launches his or her traffic together with a WP value into the communications network. On entry to the communications network, the customer is then charged according to his or her declared WP and the traffic or message is tagged with a value of:

$$\Delta = n \cdot \sum_{i=1}^{m} SDP_i$$

Then, on transit through the network, this amount Δ is decremented at each node or resource such that at the $m^{th}$ resource Δ becomes:

$$\Delta_m = n \cdot \sum_{i=1}^{m} SDP_i - \sum_{i=1}^{m} (P_i - WP_i)^2$$

This enables the situation in which a congestion point emerges in the route after the customer has set the value of WP to be dealt with. The value of Δ indicates the amount of "credit" available to be used to overcome rising prices as a result of the emerging congestion point. If the customer set a low value of WP then the amount of "credit" may run down quickly and be used up. In this case the traffic is not passed on by the next node in the route and fails to reach its destination. Thus in this example, each node 14 in the route has the ability to decrement Δ and to refuse to forward traffic where the amount of credit is not sufficient.

As mentioned above, one problem involves the amount of extra traffic generated by the pricing mechanism itself. For example, polling messages in which customers request price information and the replies to these requests create extra traffic in themselves. In order to address this problem a polling overload mechanism is used. For example, the fast reflector switch is configured to return price information to customers only when there is sufficient capacity to return the price information. If the price information is such that it impacts overall network resource performance it is not forwarded to customers by the fast reflector switch.

Alternatively, the frequency of price information messages sent to the customers may be limited during busy times. As well as this it is possible to limit the number of messages sent by customers to the communications network. For example, this is done by setting a minimum time that must elapse before a failed resource request may be re-launched by a customer. In another example, a fixed price is associated with each resource request initiated by a customer. This fixed price is preferably specified to be comparable to the cost to the network operator of reflecting the price to the customer.

Figure 5:
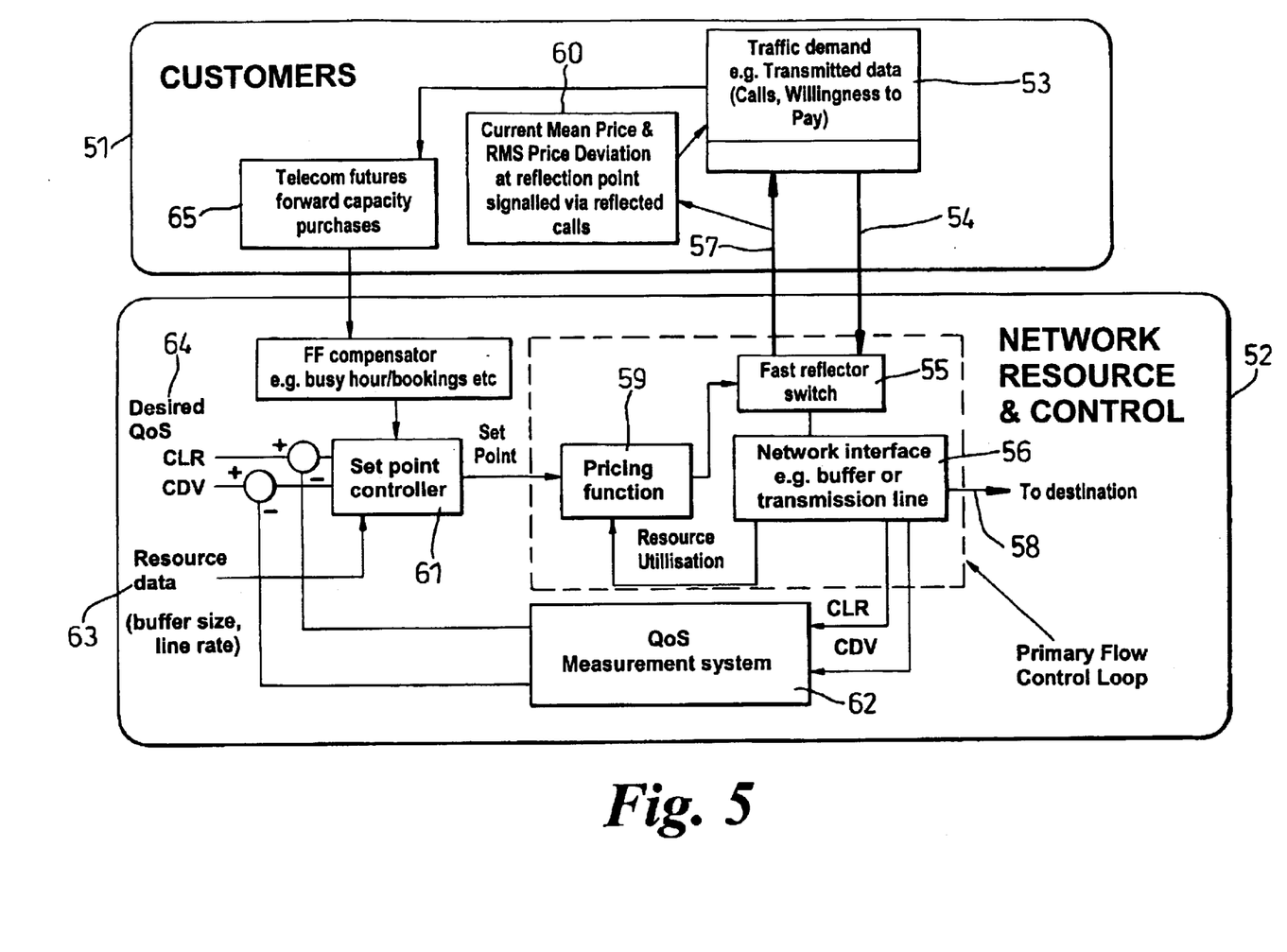
FIG. 5 is a schematic flow diagram of a pricing mechanism for use in a communications network for resource control.

FIG. 5 is a schematic flow diagram of a pricing mechanism for use in a communications network for resource control. Customers 51 are represented in the top part of FIG. 5 and a communications network 52 in the bottom part of FIG. 5. As in FIGS. 2 and 3, there is a large customer base 51 where the customers have varying willingnesses to pay and varying required bandwidths and capacities. There is a demand for traffic 53 from the customer base and request messages including information about each customer's WP are transmitted to the communications network 52. This is indicated by arrow 54 in FIG. 5. A fast reflector switch is connected to a network interface or access point 56. This fast reflector switch 55 reflects price information from the communications network to the customers 51 and this is indicated by arrow 57 in FIG. 5. The network interface or access point 56 is connected indirectly to destination points in the communications network, to which customers 51 require to send messages. The connections to these destination points are indicated by arrow 58 in FIG. 5.

The amount of available resources at different nodes in the communications network is monitored and this information forwarded from the network interface 56 to a pricing function 59. The pricing function is any suitable processor which is arranged to accept information about the amount of available resources and to produce a price on the basis of this information. The output of the pricing function 59 is price information and this is sent to the fast reflector switch 55 as indicated in FIG. 5. For example, this price information may include the current mean price and the root mean square value of the standard deviations of the price as indicated in box 60 in FIG. 5.

A set point controller 61 is also provided associated with the communications network 52. The set point controller determines a target amount of resource loading for the communications network as a whole. Alternatively, the set point controller may simply contain a specified target amount of resource loading that is set by the network operator.

In one example, the set point controller 61 determines the target amount of resource loading automatically on the basis of quality of service measures and quality of service targets. As well as this the set point may be determined on the basis of characteristics of the traffic sources such as peak and mean bit rate (i.e. burstiness). Thus in FIG. 5 the set point controller 61 is shown as receiving inputs from a quality of service measurement system 62 as well as from a data source 63 containing information about the communications network resources such as buffer size and line rate. The set point controller 61 also receives inputs from stores containing quality of service targets 64. For example, these quality of service targets may be specified in terms of CLR (cell loss ratio) and CDV (cell delay variation).

A feed forward compensator 65 is also connected to the set point controller 61. The function of the feed forward compensator 65 is to forecast busy times and to trigger a process of off-loading traffic or increasing prices in anticipation of these busy times. Similarly, the feed forward compensator 65 is arranged to forecast quiet times and changes in amounts of traffic in order that prices and traffic levels can be adjusted in advance.

In order to carry out this forecasting function, the feed forward compensator has access to information about traffic demand behaviour in the past as well as to information about future known events, such as a television "phone in" or Mother's day. These future known events may include customer bookings for future use of the communications network. In this case, customers are able to make advance purchases of network capacity as indicated in box 65 of FIG. 5. These advance purchases are termed "futures". In another example, the customers are able to purchase the right to buy network capacity in the future for a fixed price. These rights to buy in the future are termed "options". Each resource or node in the communications network maintains its own database of accepted reservations and the prices agreed for these.

A method of purchasing a future is now described. A customer has access to information about the current and possibly past prices for use of the network and on this basis formulates an offer price to reserve capacity on a specified route in the network at a specified time in the future. The offer price, specified route and specified time are forwarded to the fast reflector switch 55. This fast reflector switch then forwards this information to each resource or node in the required route. This may be done in series or in parallel. Each node then assesses the customer's offer against its database of accepted reservations and either accepts or rejects the reservation. Information about whether the reservation is accepted or rejected is passed back to the fast reflector switch and from there to the customer. In this way latecomers buying capacity when the resources are already partly loaded pay higher prices for this capacity than early-birds.

Using this method it is possible for customers to act as traders and to buy in advance blocks of capacity and then re-sell these closer to the time of use. In this way a futures market is developed. By allowing such a futures market to develop the advantage that a "market price" for capacity is yielded from the futures market is achieved. This "market price" can then be used for other purposes outwith the futures market, such as for setting a working starting-price.

Figure 4:
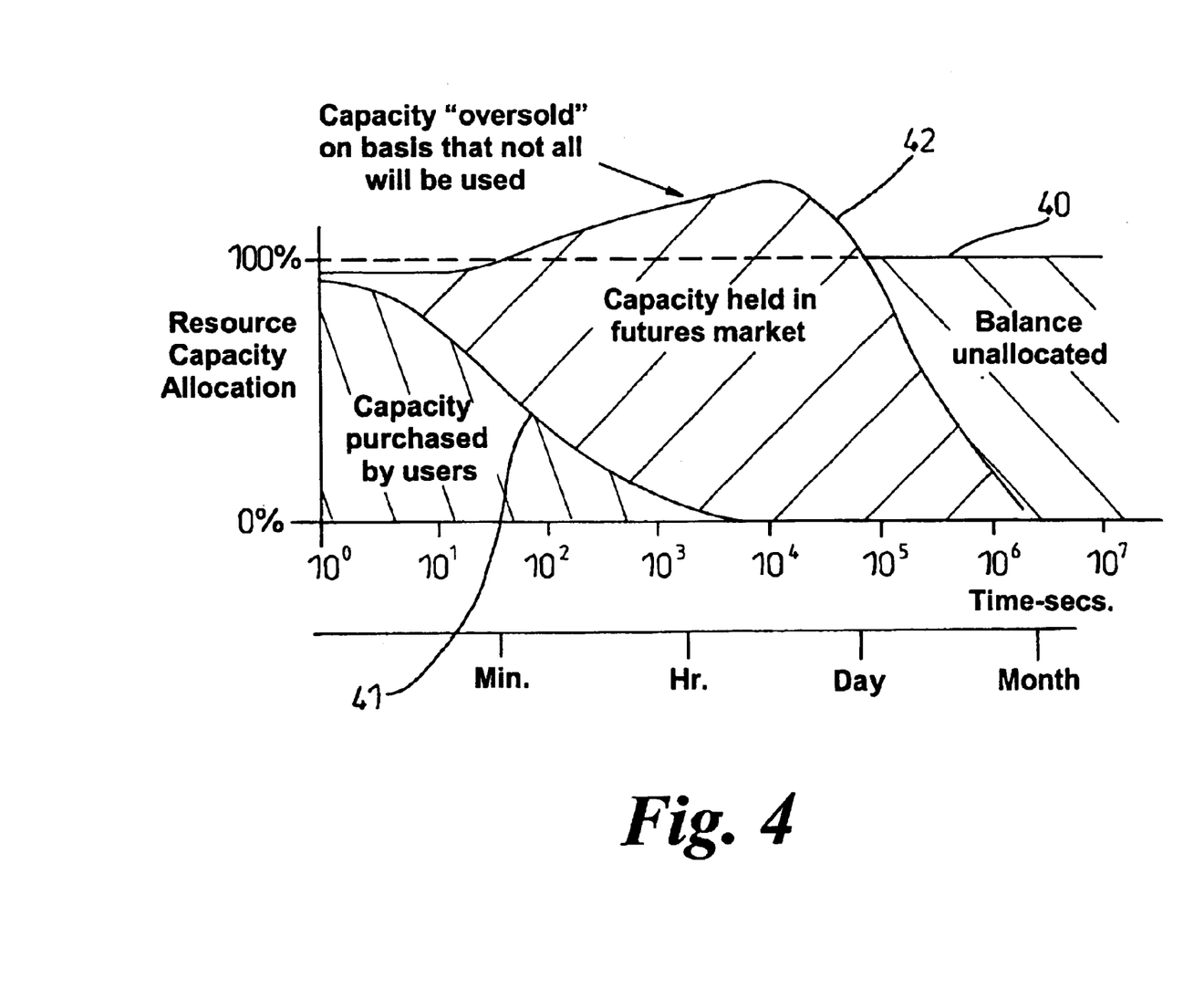
FIG. 4 is a graph of resource capacity allocation in a communications network against time.

FIG. 4 is a schematic graph of the amount of resource capacity used in a communications network against time. Ideally the network operator requires the resource capacity to be fully used all the time. This situation is indicated by the horizontal line 40 at 100% in the graph. The area under line 41 in the graph represents the amount of capacity that has been purchased by customers for use now and into the near future. The region of the graph between line 40 and line 42 represents network resource capacity that has not yet been sold or allocated. The region between line 42 and line 41 then represents network resource capacity that has been booked or reserved for future use. For example, some customers may have exploited their own knowledge of their future requirements in order to purchase capacity in advance and obtain a good price as a result. Also, futures traders may have studies the market characteristics,, predicted likely demand and future prices and then purchased forward capacity for resale nearer the time of use. It is also possible for the network operator to oversell capacity. Oversold capacity is indicated in FIG. 4 by the region between line 42 and line 40. The network operator oversells capacity on the basis that not all pre-booked capacity will actually be used.

As described above, the price for using the communications network may vary during a communication session, as resource levels fluctuate. For example, a customer may start a traffic session having given a particular WP value that was accepted by the fast reflector switch. However, as time progresses and resource levels in the network fluctuate, a congestion may arise which increases the current price. In that case, the customer's traffic session is either terminated because the WP is not sufficient to cover the price rise, or the customer is faced with a bigger bill than expected. The opposite situation may also arise however, where the network congestion eases and the customer ends up paying more than necessary.

In order to address this problem, the pricing mechanism and communications network are arranged to operate using a lifetime value in conjunction with each price. A lifetime value is a specified time period over which the associated price is guaranteed to apply. Lifetime values are provided by both customers and the communications network pricing mechanism. By using lifetime values, dynamic pricing and resource allocation is operable whilst allowing guaranteed prices or price ranges to be set. This type of dynamic pricing and resource allocation will operate on all types of traffic session such as ATM ABR (asynchronous transfer node available bit rate) and circuit switched telephony.

Consider an example in which a customer wishes to make a telephone call using the communications network 10. The customer requests price information from the fast reflector switch or other suitable network node. The customer's request includes information about the type of communication session and amount of bandwidth required as well as a lifetime value. That is, the customer uses a lifetime value to specify the time period over which he or she requires the price information to apply. The price information is determined as explained in any of the examples above. For example using a pricing function 59 and set point controller 61. The fast reflector switch 30 forwards the price information to the customer together with a lifetime value over which that price is guaranteed to apply.

In order to determine the lifetime value over which a price is guaranteed to apply, the fast reflector switch or other processor in the communications network accesses information that is available to the feed forward compensator. For example, details about bookings and predicted busy times. Consider the situation where a customer requests a price to use the network for 15 minutes in 1 hours time. Each node in the requested route is assessed to check its available capacity in 1 hours time and over the 15 minute period concerned, based on pre-booking information for each of those nodes. This capacity information for each node is then combined to produce a single price. For example, the price may be based on the available capacity at the node which has the highest level of bookings over the required time period. Information from the feed forward controller about forecasted traffic levels in 1 hours time and over the 15 minute period is then obtained and used to weight the available capacity information previously obtained. However, it is not essential to perform this weighting step. In this way a price is determined for the required time period and a lifetime value may be given that is equal to the requested time period.

In another embodiment the price and lifetime value are determined as above and then price and lifetime values are determined for time periods slightly shorter and slightly longer than the requested time period. If the results of these determinations differ significantly, the customer is presented with each of the price and lifetime combinations determined. Similarly, if the requested lifetime cannot be obtained because the network is fully booked during part of the requested time period then a nearest working equivalent time period and price are determined and provided to the customer.

If the customer accepts the price and associated lifetime value offered by the network provider via the fast reflector switch, then a reservation is made for the required capacity (at the required time) at each of the nodes and other network resources involved. This reservation process takes place using any suitable reservation methods as are known in the art. Also, a record of the agreed price and lifetime value are passed to a billing system in order to bill the customer correctly.

It is also possible to associate an indication of quality of service with the price and lifetime value. This allows a particular level of quality of service to be guaranteed for a particular time period and price.

Using the lifetime values together with prices, it is possible to allow a futures market to develop as described above. A customer is able to buy the right to purchase bandwidth with a given set of performance characteristics within a specified time period for a guaranteed price.

Figure 6:
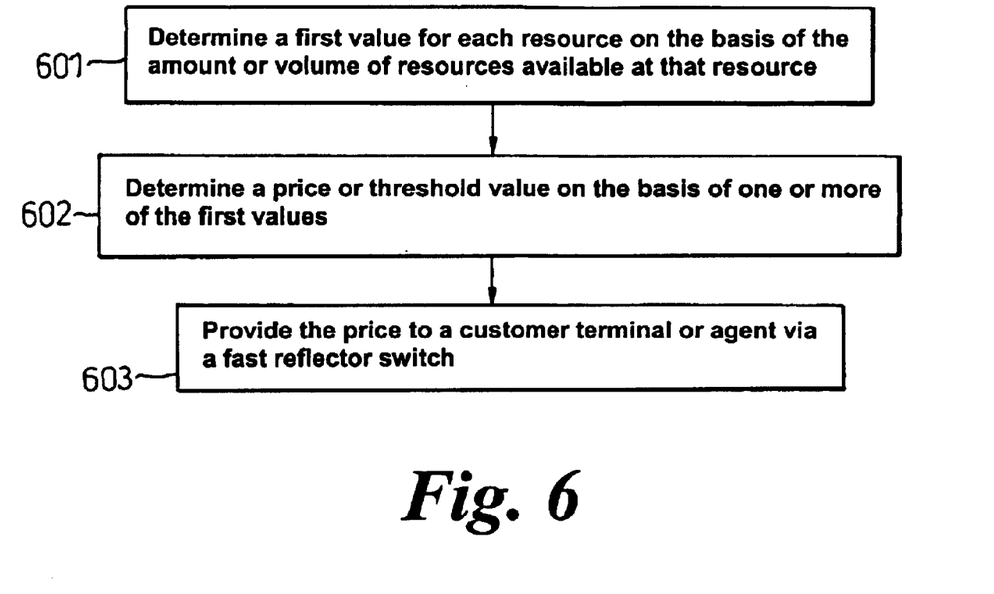
FIG. 6 is a flow diagram of a method of determining a threshold value for gaining access to a route in a communications network.

FIG. 6 is a flow diagram of a method of determining a threshold value for gaining access to a communications network, said communications network comprising a plurality of resources, said method comprising the steps of:

for each of said resources determining a first value on the basis of the amount or volume of resources available at that resource (box 601 of FIG. 6); and determining said threshold value on the basis of one or more of said first values (box 602 of FIG. 6).

Figure 7:
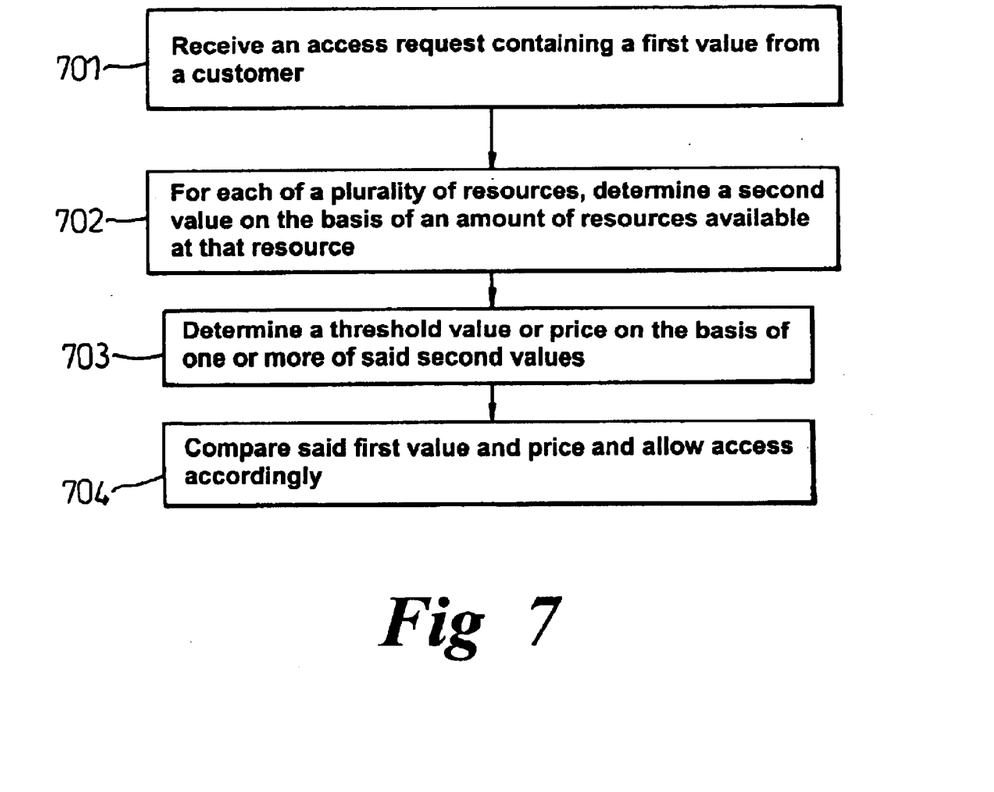
FIG. 7 is a flow diagram of a method of controlling access to a communications network.

FIG. 7 is a flow diagram of a method of controlling access to a communications network said communications network comprising a plurality of resources, said method comprising the steps of:

receiving an access request from a user, said access request containing a first value (box 701 of FIG. 7);

for each of said resources, determining a second value on the basis of the amount of resources available at that resource (box 702 of FIG. 7);

determining a threshold value on the basis of one or more of said second values (box 703 of FIG. 7); and comparing said first value and said threshold value and allowing access to said communications network on the basis of said comparison (box 704 of FIG. 7).

Figure 8:
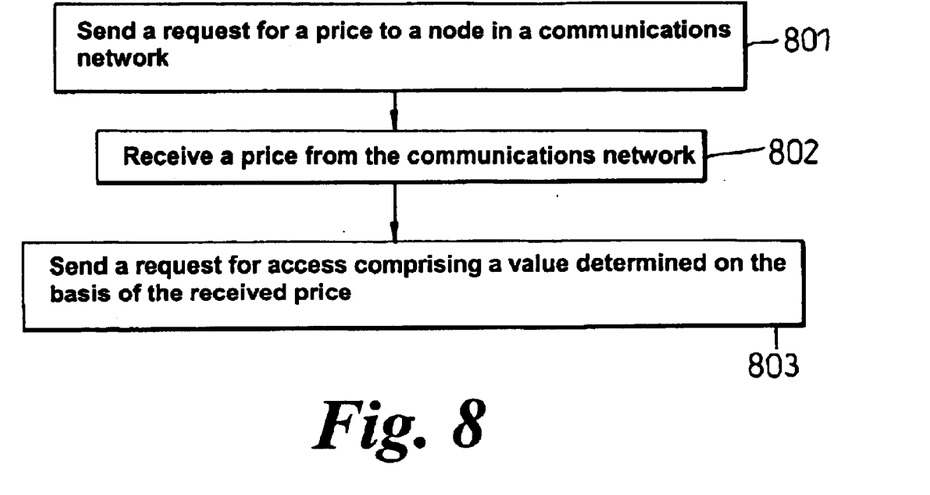
FIG. 8 is a flow diagram of a method of requesting access to a communications network.

FIG. 8 is a flow diagram of a method of requesting access to a communications network, said communications network comprising a plurality of resources, said method comprising the steps of:

sending a request for a threshold value to a node in said communications network (box 801 of FIG. 8);

receiving said threshold value (box 802 of FIG. 8);

sending a request for access to said communications network said request comprising a value determined on the basis of said threshold value (box 803 of FIG. 8).

It is not essential for the customer or user to request price information from the communications network in this way. For example, the communications network may be arranged to automatically broadcast price information changes or updates to customers.

The pricing mechanism described herein is implemented using computer programs to control the processors such as the network nodes, fast reflector switch and other elements described above. Any suitable programming language may be used and the computer program may be stored on a computer readable medium.

Figure 9:
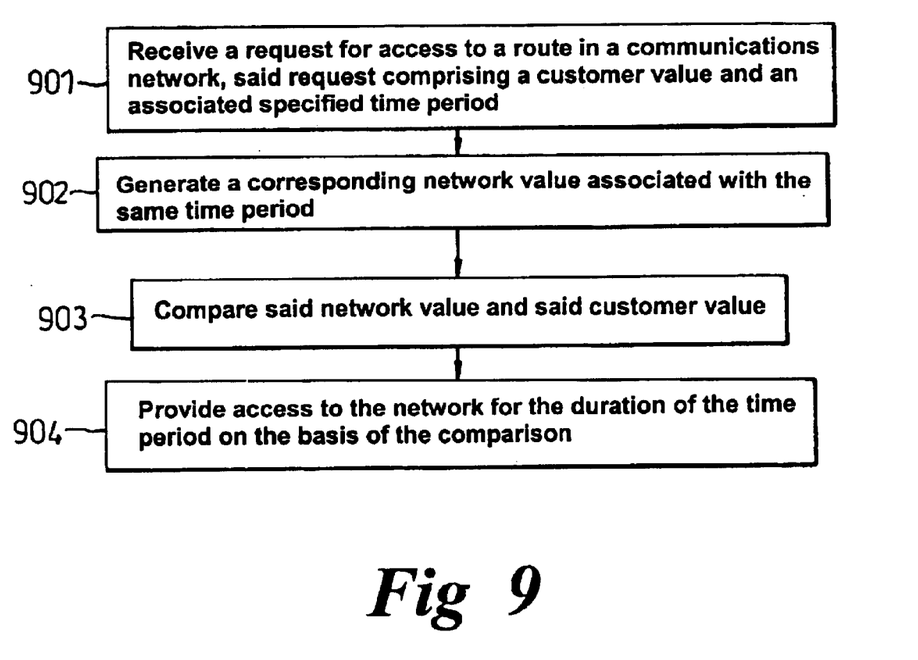
FIG. 9 is a flow diagram of a method of controlling access to a communications network.

FIG. 9 is a flow diagram of a method of controlling access to a communications network said method comprising the steps of:

receiving a request for access to the communications network said request comprising a customer value and an associated specified time period (box 901 of FIG. 9);

generating a corresponding network value associated with the same time period (box 902 of FIG. 9);

comparing said network value and said customer value (box 903 of FIG. 9); and providing access to the communications network for the duration of said time period on the basis of said comparison (box 904 of FIG. 9).

Figure 10:
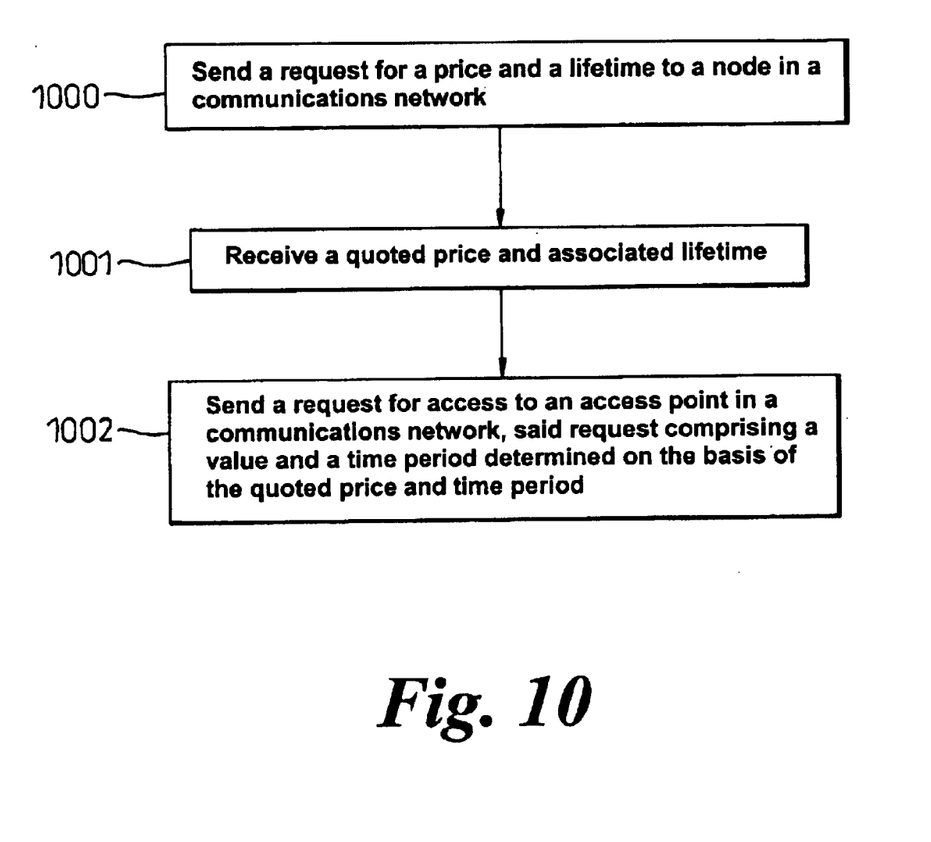
FIG. 10 is a flow diagram of a method of requesting access to a communications network.

FIG. 10 is a flow diagram of a method of requesting access to a communications network, said communications network comprising a plurality of resources, said method comprising the steps of:

sending a request for a threshold value and an associated time period (duration) over which said threshold value is guaranteed to apply to a node in said communications network (box 1000 of FIG. 10);

receiving said threshold value and associated time period (price guarantee period) (box 1001 of FIG. 10);

sending a request for access to said communications network said request comprising a value and a time period determined on the basis of said threshold value and its associated time period (box 1002 of FIG. 10).

A range of applications are within the scope of the invention. These include situations in which it is required to provide dynamic resource allocation in communications networks by using pricing mechanisms or values that indicate priority rather than actual money or money's worth.

What is claimed is:

1. A method of determining a threshold value for gaining access to a communications network, said communications network comprising a plurality of resources, said method comprising the steps of:

(i) for each of a plurality of the resources determining a first value on the basis of the amount of resources available at that resource; and (ii) for each of sad resources, determining a second value related to th variation in the amount of resources available at that resource over a specified time period, (iii) determining said threshold value on the basis of one or more of said first values and an integer multiple of the sum of said second values.

2. A method as claimed in claim 1 wherein said resources comprise nodes.

3. A method as claimed in claim 1 wherein said resources comprise links.

4. A method as ciaimed in claim 1 wherein said method is for gaining access to a route in the communications network, said route comprising a plurality of nodes interconnected by links.

5. A method as claimed in claim 1 wherein said threshold value is a price.

6. A method as claimed in claim 1 wherein said step of determining said threshold value comprises determining the maximum of said first values.

7. A method as claimed in claim 1 wherein each of said first values is determined on the basis of an average of the amount of recourses available at the resource over a specified time period.

8. A method as claimed in claim 1 wherein said second values are measures of standard deviation.

9. A method as claimed in claim 1 which further comprises providing said threshold value to a customer terminal via a fast reflector switch.

10. A method as calmed in claim 9 which further comprises assessing an amount of available capacity on a link between said fast reflector switch and said customer terminal and wherein said threshold value is only provided to the customer if said amount of available capacity is greater than a pre-specified amount.

11. A method as claimed in claim 1 wherein said threshold value is also determined on the basis of target quality of service levels.

12. A method as claimed in claim 1 wherein said threshold value is also determined on the basis of predicted traffic levels.

13. A method as claimed in claim 1 wherein said threshold value is also determined on the basis of information about advance resource reservations.

14. A method of controlling access to a communications network said communications network comprising a plurality of resources, said method comprising the steps of:
   (i) receiving an access request from a user, said access request containing a first value;
   (ii) for each of a plurality of said resources, determining a second value on the basis of the amount of resources available at that resource;
   (iii) for each of said resources, determining a third value related to the variation in the amount of resources available at that resource over a specified time period,
   (iv) determining a threshold value on the basis of one or more of said second values and an integer multiple of the sum of the third values; and
   (v) comparing said first value and said threshold value and allowing access to said communications network on the basis of said comparison.

15. A method as claimed in claim 14 wherein a fixed price is associated with said access request.

16. A method as claimed in claim 14 which further comprises, for each of said plurality of resources, decrementing said first value by an amount related to the difference between said first value and that resource's second value.

17. An apparatus for determining a threshold value for gaining access to a communications network, said communications network comprising a plurality of resources, said apparatus comprising:
   (i) an input arranged to access a first value related to the amount of resources available at that resource, for each of a plurality of said resources;
   (ii) an input arranged to access a second value related to the variation in the amount of resources available at that resource over a specified time period,
   (iii) a processor arranged to determine said threshold value on the basis of one or more of said first values and an integer multiple of said second value.

18. An apparatus as claimed in claim 17 wherein said processor is arranged to determine said threshold value on the basis of the maximum first value.

19. A communications network comprising a plurality of resources and a processor arranged to access a plurality of first values, each related to the amount of resources available at a resource, and a plurality of second values each related to the variation in the amount of resources available at a resource over a specified time period and wherein said processor is arranged to determine a threshold value on the basis of one or more of said first values and an integer multiple of the second values.

20. A communications network as claimed in claim 19 which further comprises a fast reflector switch associated with an access point in said communications network and arranged to forward said threshold value to customer terminals connected to that access point.

21. Communications network as claimed in claim 19 wherein each resource is arranged to determine be first value associated with that resource on the basis of an average of the amount of resources available at that resource over a specified time period.

22. A communications network as claimed in claim 19 wherein each resource is arranged to determine a second value related to the variation in the amount of resources available at that resource over a specified time period.

23. A computer program stored on a computer readable medium, said computer program being arranged to control an apparatus for determining a threshold value for gaining access to a communications network, said communications network comprising a plurality of resources, said computer program being arranged to control said apparatus such that:
   (i) a plurality of first values are accessed, each relating to the amount of resources available at a respective resource; and
   (ii) a plurality of second values are accessed each relating to the variation in the amount of resources available at a respective resource; and
   (iii) a threshold value is determined on the basis of one or more of said first values and an integer multiple of the sum of said second values.

24. A computer program as claimed in claim 23 which is arranged to control said apparatus such that said threshold value is determined on the basis of the maximum first value.

* * * * *